United States Patent
Majima et al.

(10) Patent No.: US 6,780,482 B2
(45) Date of Patent: Aug. 24, 2004

(54) POLYESTER FILM FOR METAL SHEET LAMINATING, METAL SHEET LAMINATED WITH THIS FILM, AND METAL VESSEL FORMED FROM THIS METAL SHEET

(75) Inventors: Shigemi Majima, Kyoto (JP); Mikio Kusunoki, Kyoto (JP); Akira Menju, Kyoto (JP); Yukiko Inui, Kyoto (JP); Norikazu Matsui, Kyoto (JP); Masanobu Hioki, Kyoto (JP)

(73) Assignee: Unitika Ltd., Hyogo (JP)

( * ) Notice: Subject to any disclaimer, the term of this patent is extended or adjusted under 35 U.S.C. 154(b) by 27 days.

(21) Appl. No.: 10/169,215

(22) PCT Filed: May 28, 2001

(86) PCT No.: PCT/JP01/04475

§ 371 (c)(1),
(2), (4) Date: Jun. 26, 2002

(87) PCT Pub. No.: WO01/92417

PCT Pub. Date: Dec. 6, 2001

(65) Prior Publication Data

US 2003/0069387 A1 Apr. 10, 2003

(30) Foreign Application Priority Data

| May 30, 2000 | (JP) | 2000-160379 |
| Dec. 9, 2000 | (JP) | 2000-276658 |
| Dec. 1, 2001 | (JP) | 2001-005078 |

(51) Int. Cl.$^7$ .......................... C08L 67/02; B32B 1/02
(52) U.S. Cl. .................... 428/35.8; 428/458; 525/444
(58) Field of Search ............... 428/35.8, 458; 525/444

(56) References Cited

U.S. PATENT DOCUMENTS

5,885,689 A * 3/1999 Hasegawa .................... 428/141
5,922,164 A * 7/1999 Kimura .................... 156/308.2

FOREIGN PATENT DOCUMENTS

EP 685509 12/1995

* cited by examiner

*Primary Examiner*—Patricia A. Short
(74) *Attorney, Agent, or Firm*—Fildes & Outland, P.C

(57) ABSTRACT

A polyester film for metal sheet laminating. The film comprises a blend of (I) polybutylene terephthalate or a polyester comprising it as the main ingredient with (II) polyethylene terephthalte or a polyester comprising it as the main ingredient, the contents of the polyester (I) and the polyester (II) being 80 to 40 wt % and 20 to 60 wt %, respectively. This film has a melting point of 200 to 223° C. attributable to the polyester (I) and a melting point of 230 to 256° C. attributable to the polyester (II). The film as a whole has an intrinsic viscosity of 0.75 or higher.

8 Claims, 1 Drawing Sheet

POLYESTER FILM FOR METAL SHEET LAMINATING, METAL SHEET LAMINATED WITH THIS FILM, AND METAL VESSEL FORMED FROM THIS METAL SHEET

TECHNICAL FIELD

The present invention relates to a polyester film for metal sheet laminating, a metal sheet laminated with the film, and a metal container formed from the metal sheet. More particularly, the invention relates to a polyester film for metal sheet laminating and a metal sheet laminated with the film, which are suitable for production of a container by deep drawing and ironing of the metal sheet, and to a metal container formed from the metal sheet.

BACKGROUND ART

It is a common practice to apply a solvent-type paint essentially containing a thermosetting resin on interior and exterior surfaces of a metal can for prevention of corrosion. However, formation of a coating film of the solvent-type paint requires heating at a high temperature, and entails evaporation of a large amount of a solvent, thereby presenting problems associated with operation safety and environment. Recently, coating the surfaces of the can with a thermoplastic resin has been proposed as a solvent-free corrosion preventing method. Among thermoplastic resins, polyesters are particularly excellent in formability and heat resistance, so that polyester-based films for metal sheet laminating particularly suitable for applications to cans are now under development.

For coating a metal sheet with a film, a thermoplastic resin is melt-extruded directly on the metal sheet, or a thermoplastic resin film is heat-pressed on the metal sheet directly or with the intervention of an adhesive. Particularly, the use of the thermoplastic resin film is advantageous, because the resin can be easily handled with an excellent operability and the resin film has a highly uniform thickness. Since the use of the intervening adhesive is disadvantageous in terms of environmental consideration and costs, the direct heat-press of the film on the metal sheet is more advantageous and attractive.

A metal can coated with the thermoplastic resin film is produced by laminating a metal sheet such as a steel sheet or an aluminum sheet (including a metal sheet subjected to a surface treatment such as plating) with the thermoplastic resin film, and working the laminated metal sheet into the can.

The thermoplastic resin film for use in such an application should simultaneously satisfy various property requirements. That is, the film is required: (a) to have an excellent heat laminatability with respect to the metal sheet; (b) to ensure an excellent can workability without film separation and occurrence of cracks and pinholes in a can working process; (c) to be free from embrittlement when being subjected to a printing process and a retort sterilizing process after the can working process, and when being stored for a long period of time; and (d) to be excellent in content taste and flavor preserving property.

Several types of polyester films including films imparted with heat laminatability and films formed of polyesters blended or copolymerized with other components for improvement of the can workability have been proposed as the thermoplastic resin film for metal sheet laminating.
(A) Films each formed of a copolymer of polyethylene terephthalate (PET) and a second component, for example, are stated in JP-B-8-19245, JP-B-8-19246 and Japanese Patent Publication No. 2528204.
(B) Films each formed of a blend comprising 99 to 60 wt % of a polyester copolymer containing ethylene terephthalate as a main recurring unit and having a melting point of 210 to 245° C. and 1 to 40 wt % of polybutylene terephthalate (PBT) or a copolymer thereof are disclosed in Japanese Patent Publication No. 2851468, JP-A-5-186612 and JP-A-5-186613.
(C) A film comprising 99 to 60 wt % of a polyester copolymer and 1 to 40 wt % of a polyester mainly containing butylene terephthalate and having a melting point of 180 to 223° C., and having an intrinsic viscosity of not lower than 0.68 and lower than 0.75 is disclosed in JP-A-10-316775.
(D) A polyester film having an intrinsic viscosity of not lower than 0.75 is disclosed in JP-B-7-84532.
(E) A film of a polyester containing an ethylene terephthalate unit in a proportion of 90 mol % and having a reduction viscosity of 0.8 to 1.1 dl/g is disclosed in JP-A-11-279294.

In the case (A), the films formed of the PET copolymer each have a lower melting point and a lower crystallinity, whereby the heat laminatability and the formability are improved. However, the films are liable to be embrittled when being subjected to a heat treatment and the retort sterilizing process after the can working. Therefore, the shock resistance is disadvantageously reduced.

In the case (B), the films each comprise a PBT-based resin, whereby the embrittlement resistance and the shock resistance after the can working and the heat laminatability are improved. However, the heat laminatability and the adhesion with respect to a metal are insufficient. Therefore, the formability in a high-level working process, particularly in a deep drawing and ironing process, is unsatisfactory.

In the case (C), the film has a low intrinsic viscosity (not lower than 0.68 and lower than 0.75), so that a deformation follow-up property for a severer deep-drawing and ironing process is insufficient. In addition, the crystallization characteristic of the film is unsatisfactory because the resin virtually contains the PBT component in a proportion of not greater than 40 wt %. Therefore, the resistance to the retort process, the long-term storage stability after the process and the shock absorbing property are not always sufficient.

In the case (D), the use of the polyester film having an intrinsic viscosity of not lower than 0.75 is proposed. It is stated that the film is effective for the retort resistance and the shock resistance and for prevention of the deterioration in the taste of the content.

More specifically, a homogeneous copolymer essentially containing PET, polyethylene naphthalate or polycyclohexanedimethylene terephthalate is proposed as the polymer. The film for the can is required to have properties contradictory to each other, e.g., a heat-laminating property, a deformation follow-up property for a severer high-level working process, resistance to adhesion to a working jig and long-term storage stability after the retort process, to satisfy recent high performance requirements. However, it is difficult for the aforesaid homogeneous polymer to satisfy all the property requirements.

In the case (E), the polyester film is proposed, which contains the ethylene terephthalate unit in a proportion of at least 90 mol %, has a reduction viscosity of 0.8 to 1.1 dl/g, and is durable in a deep-drawing and ironing process and less susceptible to whitening when being immersed in boiling water. The polyester film is imparted with a boiling water resistance by employing a polymer containing the ethylene terephthalate unit having a higher resistance to heat and boiling water in a proportion of not smaller than 90 mol %. The polyester film is imparted with the adhesion to a metal by introducing a copolymerizable component in a proportion of not smaller than 3 moles and smaller than 10 moles into the polymer.

However, this polymer also falls within the category of the homogeneous polymer, suffering from the same limitations as in the case (D). Therefore, the polymer cannot sufficiently satisfy the requirement for the deformation follow-up property for a recent high-speed and high-level working process. More specifically, the concentration of the copolymerizable component in the polyester should be increased if greater importance is placed on the deformation follow-up property. As a result, the adhesion of the film to a jig is increased in the can working process, thereby deteriorating the productivity, and the retort resistance and long-term storage stability of the can.

On the contrary, the inventors of the present invention previously proposed biaxially stretched films each comprising 90 to 45 wt % of a PBT or PBT-based polyester (I) and 10 to 55 wt % of a PET or PET-based polyester (II) (JP-A-9-194604, JP-A-10-110046). The films thus proposed each have a high crystallinity, and allow for heat-press at a relatively low temperature. In addition, the resulting laminated metal sheets are excellent in workability. Further, the films are not embrittled even during a retort sterilizing process and after long-term storage, and are excellent in shock resistance.

Further, WO95-15993 proposes a polyester film composed of a polyester composition obtained by homogeneously mixing a polyethylene terephthalate containing an ethylene terephthalate unit as a main recurring unit with a polybutylene terephthalate containing a butylene terephthalate unit as a main recurring unit. The polyester film is designed so that the crystallization temperature, secondary transition temperature and plane orientation factor thereof respectively fall within predetermined ranges. Therefore, the polyester film is free from white spots even if being subjected to the retort process after being melt-laminated on a metal sheet.

With recent increasing demands for a higher can producing rate, a greater can volume and a smaller can thickness, there is a tendency toward an increase in the working deformation ratio of the metal in the deep-drawing and ironing process, and toward an increase in friction occurring with respect to the working jig. Even if the film proposed by the inventors is applied on a can body to be subjected to severe deformation, the film suffers from whitening or micro-cracks occurring due to slight fluctuations in conditions for the production of the laminated metal sheet or in conditions for the production of a final can product.

In addition, a residual strain occurring in the film due to an increased working ratio may cause separation of the film due to partially insufficient adhesion to the metal, thereby arousing concern about protection of the content of the can. Further, the film may adhere to a deep-drawing/ironing jig in the can production process, thereby causing rupture of the can body. Hence, it is demanded to improve the film so that the film is able to maintain its properties even under severer working conditions. Since cans are extensively utilized for cold soft drink, there is a great demand for improvement of the shock resistance of the laminate film to withstand an external impact force exerted on the cans when the cans are dropped or during the processing or distribution of the cans. Since the cans are stored for a long period of time, long-term stability is also an important property of the film for long-term cold storage of the cans and hot storage of the cans in winter. As film-laminated cans are more extensively utilized, the film and the film-laminated cans are now required to provide more advanced performance. Hence, there is a demand for immediate development and improvement of a film suitable for the film-laminated cans.

SUMMARY OF THE INVENTION

It is an object of the present invention to provide a polyester film for metal sheet laminating, which is excellent in heat laminatability with respect to a metal sheet, in can workability, particularly high-level workability for deep drawing and ironing, in shock resistance and in content taste and flavor preserving property, and is suitable for a film-laminated metal can, and to provide a laminated metal sheet and a metal container formed from the laminated metal sheet.

To achieve the aforesaid object, there is provided a polyester film for metal sheet laminating, the polyester film comprising a blend of a polyester (I) consisting of polybutylene terephthalate or consisting essentially of polybutylene terephthalate and a polyester (II) consisting of polyethylene terephthalate or consisting essentially of polyethylene terephthalate, the polyester (I) being present in the film in a proportion of 80 to 40 wt %, the polyester (II) being present in the film in a proportion of 20 to 60 wt %, the polyester (I) having a melting point of 200 to 223° C., the polyester (II) having a melting point of 230 to 256° C., the film, as a whole, having an intrinsic viscosity of not lower than 0.75.

With this arrangement, the polyester film for metal sheet laminating can be provided which is excellent in heat laminatability, in formability, particularly high-level workability for deep drawing and ironing and in shock resistance and retort resistance after the working, and suitable for coating a metal can.

DISCLOSURE OF THE INVENTION

Figure 1:
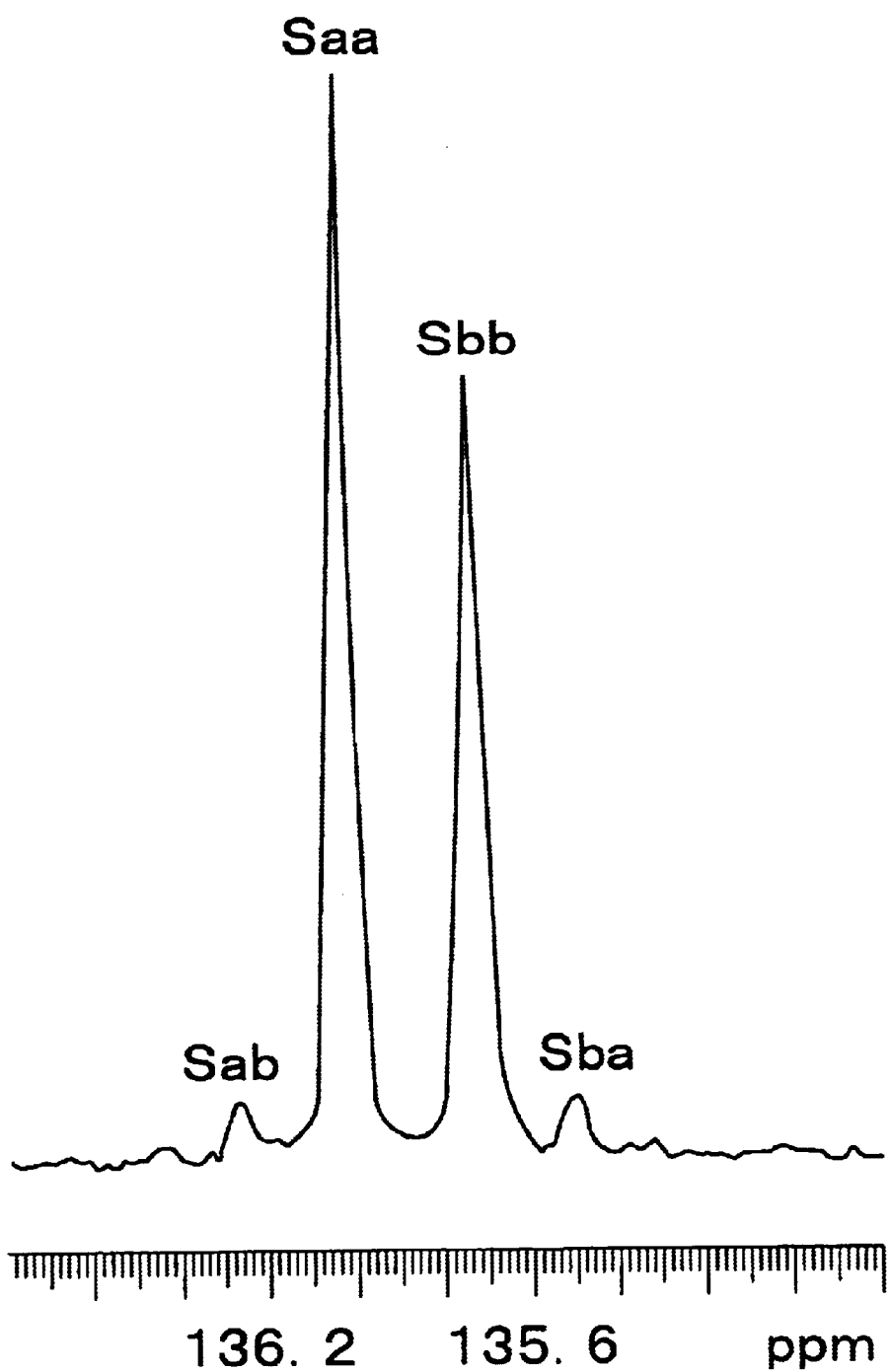
FIG. 1 is a diagram illustrating peaks attributable to ester exchange in an NMR chart of a polyester film for metal sheet laminating in accordance with the present invention.

The present invention will hereinafter be described in detail.

In the present invention, the polyester (I) consisting essentially of PBT means PBT or a copolymer of PBT and another component. In the film composed of the blend of the polyester (I) and the polyester (II), the polyester (I) needs to have a melting point of not lower than 200° C. and not higher than 223° C. If the melting point of the polyester (I) is lower than 200° C., the polyester has a lower crystallinity, resulting in a lower heat resistance of the film.

Where the PBT copolymer is employed, the proportion and structure of the copolymerizable component may be selected so that the PBT copolymer has a melting point in the aforesaid range. The copolymerizable component preferably comprises 1,4-butanediol in a proportion of not smaller than 80 mol %, particularly preferably not smaller than 90 mol %, based on a total alcohol component. If the proportion of 1,4-butanediol is smaller than 80 mol %, the crystallinity (particularly the crystallization speed) is reduced, resulting in reduction in shock resistance and barrier property after a retort process.

The copolymerizable component is not particularly limited. Exemplary acids to be employed as the copolymerizable component include dicarboxylic acids such as isophthalic acid, phthalic acid, 2,6-naphthalenedicarboxylic acid, 5-sodiumsulfoisophthalic acid, oxalic acid, succinic acid, adipic acid, sebacic acid, azelaic acid, dodecanedioic acid, dimer acids, maleic anhydride, maleic acid, fumaric acid, itaconic acid, citraconic acid, mesaconic acid and cyclohexanedicarboxylic acid, 4-hydroxybenzoic acid, ε-caprolactam and lactic acid.

Exemplary alcohols to be employed as the copolymerizable component include ethylene glycol, diethylene glycol, 1,3-propanediol, neopentyl glycol, 1,6-hexanediol, cyclohexanedimethanol, triethylene glycol, polyethylene glycol, polypropylene glycol, polytetramethylene glycol, and ethylene oxide adducts of bisphenol A and bisphenol S.

Besides, three-functional group compounds such as trimellitic acid, trimesic acid, pyromellitic acid, trimethylolpropane, glycerol and pentaerythritol may be employed in a small amount. These compounds as the copolymerizable component may be used in combination.

In the film according to the present invention, the polyester (II) consisting essentially of PET means PET or a copolymer of PET and another component. In the film composed of the blend of the polyester (II) and the polyester (I), the polyester (II) needs to have a melting pint of 230 to 256° C., preferably 236 to 256° C., more preferably 246 to 256° C.

If the melting point is lower than 230° C., the crystallinity is reduced, and the resulting film suffers from whitening and white spots after the retort process and has a reduced shock resistance after the retort process. If the melting point is higher than 256° C., the heat laminatability is reduced.

Particularly, where the polyester (II) has a melting point of not lower than 246° C., the heat resistance, the shock resistance after the retort process and the shock resistance after long-term storage are improved. Further, troubles possibly occurring due to adhesion of the film to a jig in the can working process and troubles possibly occurring due to rupture of the film during the working of a can body are effectively suppressed.

The component copolymerizable with PET is not particularly limited, but examples thereof include the same compounds as for the polyester (I).

The film according to the present invention needs to entirely have an intrinsic viscosity (IV) of not lower than 0.75. If the intrinsic viscosity is lower than 0.75, the resulting film has an insufficient practical performance, and is liable to be ruptured during the higher-level working of the can, leading to a remarkably reduced productivity. Particularly, where the can has a greater volume, the film is deformed at a greater deformation ratio when the laminated metal sheet is worked into the can through the deep-drawing and ironing process. The film cannot follow up the deformation, so that voids and cracks may occur in the film. Even a small external shock may promote the separation of the film and the development of the cracks in the film. Where the film is used for coating the interior surface of the can, the content of the can is brought into direct contact with the metal of the can. As a result, the taste and flavor preserving property is deteriorated, and a problem with flavor arises. Where the film is used for coating the exterior surface of the can, a print appearance in a portion of the film whitened due to the voids is deteriorated. Further, the voids and the cracks may cause corrosion of the can during long-term storage.

More specifically, the intrinsic viscosity is one indication of the molecular weight of the resin. A higher intrinsic viscosity means a greater molecular weight. In general, as the intrinsic viscosity or the molecular weight increases, the fluidity is reduced. Further, the heat laminatability and the adhesion to the metal sheet are reduced, but the strength and the shock resistance are improved. On the contrary, the inventive polyester film based on the particular PBT/PET composition is characterized in that the reduction in the heat laminatability and the adhesion to the metal sheet is suppressed even with an increased intrinsic viscosity, and the strength and the shock resistance are increased. In other words, the PBT/PET based film having an intrinsic viscosity of not lower than 0.75 has an excellent follow-up property for deep drawing and ironing of the can body while maintaining its heat laminatability and adhesion when the film is applied to a can as a metal container.

In WO95/15993 described above, a polyester film for metal can laminate-coating is disclosed which employs a PBT/PET based composition as in the present invention. In WO95/15993, however, there is no teaching about the intrinsic viscosity. Since an object to be coated is a lid of a can, the film is not required to have a working follow-up property which is required when the film is applied to the can body as in the present invention. Accordingly, there is no statement about the working follow-up property. In the present invention, the film is required to entirely have an intrinsic viscosity of not lower than 0.75. In WO95/15993, an intended crystallization characteristic is slightly influenced by the intrinsic viscosity, but the crystallization speed is increased with the reduction in the intrinsic viscosity. Therefore, a lower intrinsic viscosity provides a more advantageous effect.

As the materials to be employed for the production of the inventive polyester film, the polyester (I) preferably has an intrinsic viscosity of not lower than 0.70, more preferably 0.75 to 1.6, and the polyester (II) preferably has an intrinsic viscosity of not lower than 0.60, more preferably 0.65 to 1.0. A melt mixture of the polyester (I) and the polyester (II) needs to have an intrinsic viscosity of not lower than 0.75, preferably not higher than 1.2.

If the intrinsic viscosities are higher than the aforesaid ranges, a greater load is exerted on a melt extruder for melt-extrusion of the resin in the production of the film, so that the production speed may be sacrificed. Further, the melted resin resides in the extruder for an excessively long period, so that the polyesters excessively react with each other. This deteriorates the properties of the film, resulting in deterioration of the properties of the metal sheet laminated with the film. Further, the higher intrinsic viscosities prolong polymerization periods and polymerization processes, thereby increasing the costs.

A polymerization method for the polyester materials is not particularly limited, but examples thereof include an ester exchange method and a direct polymerization method. Exemplary catalysts for the ester exchange include oxides and acetates of Mg, Mn, Zn, Ca, Li and Ti. Exemplary catalysts for the polycondensation include oxides and acetates of Sb, Ti and Ge.

The polyester obtained through the polymerization may contain monomers, oligomers, side products such as acetaldehyde and tetrahydrofuran and the like. Therefore, solid phase polymerization is preferably carried out at a temperature of not lower than 200° C. under a reduced pressure or in a stream of an inert gas.

Additives such as an anti-oxidation agent, a heat stabilizer, a UV absorber and an anti-static agent may be added to the polyester materials as required in the polymerization of the polyesters. Examples of the anti-oxidation agent include hindered phenol compounds and hindered amine compounds. Examples of the heat stabilizer include phosphorus compounds. Examples of the UV absorber include benzophenone compounds and benzotriazole compounds. As a reaction inhibitor for inhibiting a reaction between the different polyesters, a conventionally known phosphorus compound is preferably added before, during or after the polymerization. It is particularly preferred to add the reaction inhibitor after completion of the melt polymerization before the solid phase polymerization.

In the present invention, it is necessary that the ratio of the polyester (I) to the polyester (II) in the film is (I)/(II)=80–40/20–60 (wt %). Preferably, the ratio is (I)/(II)=70–55/30–45 (wt %).

If the proportion of the polyester (I) in the film is greater than 80 wt %, the high crystallinity characteristic of the polyester (I) is dominant, so that the workability of the film-laminated metal sheet is reduced and the shock resistance is deteriorated. If the proportion of the polyester (I) is smaller than 40 wt %, the crystallization speed is reduced, so that the properties of the film after the retort process are deteriorated.

Particularly where the proportion of the polyester (I) is in the range of 70 to 55 wt %, the working follow-up property is satisfactory when the laminated metal sheet is subjected to a high-speed and high-level deep-drawing and ironing process. Therefore, the film is free from whitening and microcracks which may otherwise occur due to voids produced in the film by forced deformation. In addition, the film has excellent adhesion to the metal sheet, so that the physical properties of the can after the retort process are well-balanced with the shock resistance of the can. Where the film is applied on the interior surface of the can, the can is excellent in corrosion resistance, content protecting property, taste and flavor preserving property and flavor maintaining property. Where the film is applied on the exterior surface of the can, the can is free from rust and imparted with a highly gloss print pattern, thereby providing a high quality product.

The concentration of terminal carboxyl groups in the inventive film is preferably not higher than 30 equivalents/ton. If the concentration of the terminal carboxyl groups is higher than this level, the adhesion of the film to the metal jig is increased, and the slippage of the film is reduced in the can deep-drawing and ironing process. Therefore, the productivity is reduced, as the can production speed is increased. Where the concentration of the terminal carboxyl groups is high, the film has a reduced surface hardness though the reason for this is not known. Therefore, the film is easily scratched and separated in the can working process, so that the metal can has a less gloss surface. In the worst case, a metal surface of the can is exposed. The exposure of the metal surface of the can reduces the corrosion resistance, and deteriorates the taste and flavor preserving property with an influence on the taste of food contained in the can. Further, the carboxyl groups promote generation of lower molecular weight compounds in the film. These compounds may migrate into the food in the can, resulting in deterioration of the taste and flavor preserving property.

One method for controlling the concentration of the terminal carboxyl groups is to prepare the material to be used by heating a prepolymer obtained through the melt-polymerization at a temperature of not lower than its glass transition temperature and not higher than its melting point and subjecting the prepolymer to the solid phase polymerization in a stream of an inert gas or in vacuum. Other exemplary methods include addition of a so-called terminal blocking agent which reacts with the terminal carboxyl groups, reduction of a polymer melt temperature to a possible lowest level, and reduction of the moisture contents of the polymers to possible lowest levels. These methods may be employed in combination for the control of the concentration. However, the method for the concentration control is not limited to these methods, but any other methods which allow for substantial reduction of the concentration of the terminal carboxyl groups may be employed.

In the film according to the present invention, the index of the ester exchange between the polyester (I) and the polyester (II) is preferably 1 to 10%, more preferably 2 to 7% (as measured by a method to be described later).

More specifically, the inventive film is composed of a blend of PBT (BD-TPA-BD structural unit) and PET (EG-TPA-EG structural unit). The PBT and the PET are melt-mixed with each other at a temperature not lower than the melting points thereof. At this time, an ester exchange reaction takes place at ester bonds (monomer links), whereby a BD-TPA-EG structural unit which is not present in the resin materials is generated. The ester exchange index is a numerical expression representing the extent of the generation of this structural unit, which varies depending on the melt temperature, the melt period and the amount of the catalyst in the materials. As the ester exchange reaction proceeds, the glass transition temperature and the crystallinity are reduced. Further, the heat-up crystallization speed is drastically increased.

If the glass transition temperature and the crystallinity are reduced, the dragging resistance is deteriorated in the can production process. If the heat-up crystallization speed is increased, the crystallization is promoted in the can working process, resulting in whitening and rupture of the film.

In other words, where the ester exchange index is increased, particularly to higher than 10%, to further randomize the structural units of the polyesters (I) and (II), the melting point of the film is reduced and the heat resistance is deteriorated. Further, the crystallization speed is drastically increased when the film is stretched in the working process, thereby deteriorating the formability.

On the contrary, if the ester exchange index is not higher than 1%, the resulting film has a poorer deformation follow-up property, and the resulting metal sheet has a poorer workability. This is because the polyethylene terephthalate component maintains its properties while the high crystallinity PBT is present therein.

Where the ester exchange index falls within the preferred range, the crystallization speed is not excessively high. When the metal sheet is worked into the can, the film is prevented from adhering to the working jig, and the friction is reduced. Therefore, the resulting can has a more uniform surface.

A method for controlling the ester exchange index in the aforesaid range is not particularly limited, but the control of the ester exchange index may be achieved by controlling the melt temperature of the polyesters (I) and (II) in the extruder, the mixing degree in the extruder and the residence time in the extruder. A method for melt-mixing the PBT and the PET is not particularly limited, but the mixing of the PBT and the PET may be achieved by melt-mixing chips of the materials preliminarily blended in a single extruder, or by separately melting the materials in different extruders and then mixing the melted materials. The latter method is preferred in terms of the control of the ester exchange reaction. The ester exchange is significantly influenced by the type and amount of the polymerization catalyst for the polyesters, and the residual activity of the catalyst. Therefore, it is important to properly select the type and amount of the catalyst. Further, a catalysis inhibitor such as a phosphorus compound may also be employed.

In the film according to the present invention, a PBT residue index is preferably 40 to 75% (as measured by a method to be described later). If the PBT residue index is smaller than 40%, the crystallinity of the film is reduced, so that the corrosion resistance and the taste and flavor preserving property of the can are deteriorated. If the PBT residue index is greater than 75%, the adhesion of the film is reduced after the retort process, and the shock resistance is reduced.

The PBT residue index is a numerical expression representing the ratio of the residue of the BD-TPA-BD unit after the melt-mixing of the PBT and the PET in view of the structural unit (herein the PBT) of the film forming resin, similarly to the ester exchange index. By defining this numerical expression, an influence of the copolymerization degree on the can workability is taken into consideration. If the melting points of the materials respectively fall within the predetermined ranges, the copolymerization is possible. However, the BD-TPA-BD unit needs to be present in the film in an amount not smaller than a predetermined level. If the PBT residue index is reduced, the crystallinity of the film is reduced as described above.

With the same ester exchange index, the PBT residue index depends on the copolymerization degree of the film material. Where the PBT copolymer is employed as the film material, the ester exchange should be suppressed more than in the case where the PBT not copolymerized is employed. Thus, the reaction occurring during the melt-mixing is relatively suppressed.

In the film according to the present invention, a heat-up crystallization peak temperature (Tc) at which a transition from an amorphous phase occurs is preferably 60 to 100° C., more preferably 60 to 90° C.

If the Tc is higher than 100° C., the film is embrittled in the retort sterilizing process, and white spots occur in the film to deteriorate the appearance of the film. If the Tc is lower than 60° C., the formability at a higher working temperature and the content taste and flavor preserving property are deteriorated.

In the film according to the present invention, a heat-up crystallization index (Cp) is preferably not smaller than 0 J/g·° C. in a temperature range of 60 to 100° C.

If the Cp is smaller than 0 J/g·° C., the crystallization speed is excessively high around a temperature at which the crystallization begins, so that the formability is deteriorated. Therefore, the film is liable to suffer from whitening, pinholes and cracks in the high-level working process such as the deep-drawing and ironing process. The can working process is generally performed in the temperature range of 60 to 100° C., and it is important that the Cp is not smaller than 0 J/g·° C. in this temperature range.

The Cp serves as an indication of the crystallization speed observed when the film is heated up for transition from the amorphous phase. The Cp corresponds to the amount of heat released from the film when the film temperature is increased by one degree during the crystallization. The crystallization speed increases, as the heat-up crystallization index Cp reduces. The value of the Cp depends on the crystallization characteristics, the viscosity, the ester exchange index and the IV of the material resin, and the types and amounts of the additives.

When the PBT and the PET are melt-mixed at a higher melt temperature or under higher shearing conditions for an extended period of time, the ester exchange reaction and a decomposition reaction proceed, so that the characteristics of the mixture are drastically changed. Particularly where the ester exchange excessively proceeds, the melting point and the glass transition temperature are reduced, and the heat-up crystallization index is reduced below 0 J/g·° C. As a result, the excellent characteristics of the film provided by the polyester (I) and the polyester (II) may be lost, so that the heat resistance and the formability are deteriorated.

The heat-up crystallization index (Cp) is significantly influenced by the ester exchange index as well as by the IV. If the IV is lower, the crystallization speed is higher. Since the additives in the film forming resin serve as crystalline nuclei, the heat-up crystallization index is also influenced by the types and amounts of the additives.

In the film according to the present invention, the crystallization speed at a temperature around the Tg is controlled by blending the PBT having a very high crystallization speed and the PET having an extremely low crystallization speed at a temperature around the Tg in a predetermined state. That is, the film is crystallized at a temperature around the Tg, but the crystallization speed is controlled at a relatively low level and the crystallization degree is high in accordance with the present invention. The film has such unique characteristics which cannot generally be provided by a homogeneous polymer system.

Further, the film according to the present invention preferably has an elongation of not smaller than 100% at rupture at the heat-up crystallization peak temperature. If the elongation is smaller than 100%, the can workability is deteriorated.

For production of the film according to the present invention, the polyesters (I) and (II) are blended in a proper ratio, and melt-mixed at a temperature of 250 to 280° C. for 3 to 15 minutes by means of an extruder. Then, the melt mixture is extruded through a T-die into a sheet form. The sheet is brought into intimate contact with a cooling drum maintained at a temperature not higher than a room temperature so as to be cooled. Thereafter, the resulting unstretched film is introduced into a simultaneous biaxial stretching machine, and biaxially stretched at a draw ratio of 2 to 4 in a machine direction (MD) and in a transverse direction (TD) at a temperature of 50 to 150° C. Further, the film is subjected to a heat treatment at 80 to 220° C. for several seconds at a TD relaxing ratio of several percent. Thus, the intended film is produced. Prior to the introduction of the film into the simultaneous stretching machine, the film may preliminarily be stretched longitudinally at a draw ratio of about 1 to about 1.2.

The film may be produced by a successive stretching method. To be briefly described, the unstretched film is heated with the use of a roll heater or an infrared radiation, and stretched longitudinally to provide a longitudinally stretched film. The stretching is carried out in a temperature range between the glass transition temperature (Tg) of the polyester and a temperature higher by 40 degrees than the Tg by utilizing a difference between circumferential speeds of two or more rolls. The draw ratio is preferably not smaller than 2.5 and not higher than 3.6. Then, the longitudinally stretched film is sequentially subjected to a transverse stretching process, a heat setting process and a heat relaxation process to provide a biaxially oriented film. The transverse stretching process is preferably started at a temperature in the range between the Tg of the polyester and the temperature higher by 40 degrees than the Tg. The maximum temperature for the transverse stretching is preferably a temperature lower by 100 to 40 degrees than the melting point (Tm) of the polyester. The draw ratio for the transverse stretching is adjusted depending on physical property requirements of the final film, but is typically not smaller than 2.7, preferably not smaller than 3.0, more preferably not smaller than 3.6. In the heat setting process following the stretching process, the film may be stretched by 2 to 20% along the width thereof, but the stretch ratio is preferably included in the total draw ratio. After the heat setting process, the film is subjected to a process (called "relaxation process") for continuously reducing the width thereof to control the heat shrinkability of the film. Then, the film is cooled to not higher than the Tg to provide a biaxially stretched film.

The heat treatment after the stretching is required for imparting the film with dimensional stability, and may be achieved by a know method, e.g., by application of hot air, by application of infrared radiation, or by application of microwave. Among these methods, the hot air application method is most preferred because the film can evenly be heated with a high level of accuracy.

To facilitate the passage of the film and the sheet in the film production process and the can production process, a small amount of an inorganic lubricant such as silica, alumina or kaolin is preferably added to the material prior to the film production to make the surface of the film more slippery. For improvement of the appearance and printability of the film, the film may contain, for example, a silicone compound The inorganic lubricant is preferably present in the film in a proportion of 0.001 to 0.5 wt %, more preferably 0.05 to 0.3 wt %. Further, titanium dioxide may be added to the material in a proportion up to about 20% for opacification as well as lubrication. Even with addition of greater than 40% of titanium dioxide, the stretched film can be obtained in the simultaneous biaxial stretching process.

A metal sheet such as a steel sheet or an aluminum sheet is heat-laminated with the inventive polyester film. Preferably used as the metal sheet to be laminated is a steel sheet subjected to a chemical treatment such as a chromic acid treatment, a phosphoric acid treatment, an electrolytic chromic acid treatment or a chromate treatment, or a plating process employing nickel, tin, zinc, aluminum, a gun metal or a brass.

For further improvement of heat-bondability and subsequent adhesion of the film to the metal sheet, an adhesive layer may be provided on the film by co-extrusion, laminating or coating. The adhesive layer preferably has a thickness of not greater than 5 $\mu$m, more preferably not greater than 1 $\mu$m, on a dry basis. The adhesive layer is not particularly limited, but is preferably a thermosetting resin layer such as composed of an epoxy resin, a polyurethane resin or a polyester resin, or a resin obtained by modifying any of these resins.

For improvement of the exterior appearance and printability of the metal can and the heat resistance and the retort resistance of the film, one or more types of resin layers may be provided on a surface of the film opposite from the surface heat-bonded to the metal sheet. The provision of these resin layers may be achieved by co-extrusion, laminating or coating.

When the metal sheet is laminated with the inventive film, the metal sheet is preheated at 160 to 250° C., and press-bonded onto the film by means of rolls maintained at a temperature lower by at least 30 degrees, preferably at least 50 degrees, than the temperature of the metal sheet. Then, the laminated metal sheet is cooled to a room temperature. Thus, the metal sheet laminated with the film is continuously produced.

The preheating of the metal sheet is achieved by a heater-roll heat conduction method, an inductive heating method, a resistive heating method or a hot air heat transfer method. Particularly, the heater-roll heat conduction method is preferred in consideration of simplification and cost reduction of the facility.

For the cooling after the laminating process, the laminated metal sheet is immersed in a coolant such as water, or brought into contact with a cooling roll.

The metal sheet thus obtained may be subjected to a working process as it is. Alternatively, the metal sheet may be subjected to a heat treatment at a temperature higher by 10 to 30 degrees than the melting point of the polyester, and then rapidly cooled. Thus, the polyester film is brought into an amorphous phase, so that the laminated metal sheet has a higher workability.

In other words, the workability of the can (metal container) is significantly influenced by the crystallizability of the film in the amorphous phase. More specifically, the metal sheet laminated with the polyester film is deformed or drawn into a cylindrical shape or a modified cylindrical shape, and then subjected to an ironing process in the can working process. At this time, the surface of the polyester film bonded to the metal sheet is often in the amorphous phase or in a nearly amorphous phase. Particularly where the film is heat-bonded to the metal sheet without the intervention of the adhesive, the film has a higher amorphous degree. Further, a part or all of the resin is brought into the amorphous phase for improvement of the deep-drawing and ironing workability. In a known technique, it is difficult to satisfy a formability requirement for a severe deep-drawing and ironing process as well as a quality requirement for the shock resistance and the retort resistance of the can. However, as described above, the present invention focuses on the heat-up crystallization peak temperature and the heat-up crystallization index observed when the film is in the amorphous phase, making it possible to satisfy both of the aforesaid requirements.

A metal container or a can which is processed to be ready to contain food or drink therein may be named as the metal container. In a broad sense, the metal container according to the present invention includes a part of the metal container, for example, a can lid configured to be ready for a crimping process.

Where the laminated metal sheet is employed for a can body member of a three-piece can (3P-can) to be produced through a severe necking process or for a can body member of a two-piece can (2P-can) to be produced through a deep-drawing and ironing process, the excellent workability of the inventive film is particularly advantageous.

The metal can (metal container) produced with the use of the inventive film is suitable for containing coffee, green tea, red tea, oolong tea and other various process food because of its excellent retort resistance, flavor preserving property and corrosion resistance.

EXAMPLES

Next, the present invention will be described more specifically by way of examples thereof.

Materials for films according to Examples and Comparative Examples and methods for measuring physical property values are as follows:

(1) Materials
Polyester (I)

A-1: PBT subjected to solid phase polymerization, having an IV of 1.40 dl/g and a Tm of 223° C., and containing 40 ppm of a Ti catalyst and 5 equivalents/ton of COOH groups.
A-2: PBT subjected to solid phase polymerization, having an IV of 1.22 dl/g and a Tm of 223° C., and containing 40 ppm of a Ti catalyst and 7 equivalents/ton of COOH groups.
A-3: PBT subjected to solid phase polymerization, having an IV of 1.08 dl/g and a Tm of 223° C., and containing 40 ppm of a Ti catalyst and 7 equivalents/ton of COOH groups.
A-4: PBT subjected to solid phase polymerization, having an IV of 0.94 dl/g and a Tm of 223° C., and containing 100 ppm of a Ti catalyst and 12 equivalents/ton of COOH groups.
A-5: PBT not subjected to solid phase polymerization, having an IV of 0.90 dl/g and a Tm of 223° C., and containing 40 ppm of a Ti catalyst and 35 equivalents/ton of COOH groups.
A-6: PBT subjected to solid phase polymerization, having an IV of 0.80 dl/g and a Tm of 223° C., and containing 40 ppm of a Ti catalyst and 15 equivalents/ton of COOH groups.
A-7: PBT not subjected to solid phase polymerization, having an IV of 0.65 dl/g and a Tm of 223° C., and containing 100 ppm of a Ti catalyst and 50 equivalents/ton of COOH groups.
A-8: A copolymer of PBT subjected to solid phase polymerization and 5 mol % of sebacic acid (SEA), having an IV of 0.92 dl/g and a Tm of 217° C., and containing 40 ppm of a Ti catalyst and 18 equivalents/ton of COOH groups.
A-9: A copolymer of PBT not subjected to solid phase polymerization and 12 mol % of SEA, having an IV of 0.95 dl/g and a Tm of 204° C., and containing 30 ppm of a Ti catalyst and 30 equivalents/ton of COOH groups.
A-10:A copolymer of PBT subjected to solid phase polymerization and 5 mol % of isophthalic acid (IPA), having an IV of 1.05 dl/g and a Tm of 216° C., and containing 40 ppm of a Ti catalyst and 23 equivalents/ton of COOH groups.

Polyester (II)

B-1: PET subjected to solid phase polymerization, having an IV of 0.90 dl/g and a Tm of 255° C., and containing 40 ppm of a Ge catalyst and 10 equivalents/ton of COOH groups.
B-2: PET subjected to solid phase polymerization, having an IV of 0.75 dl/g and a Tm of 255° C., and containing 40 ppm of a Ge catalyst and 15 equivalents/ton of COOH groups.
B-3: PET subjected to solid phase polymerization, having an IV of 0.64 dl/g and a Tm of 255° C., and containing 100 ppm of a Sb catalyst and 20 equivalents/ton of COOH groups.
B-4: PET not subjected to solid phase polymerization, having an IV of 0.62 dl/g and a Tm of 255° C., and containing 100 ppm of a Sb catalyst and 50 equivalents/ton of COOH groups.
B-5: A copolymer of PET subjected to solid phase polymerization and 50 mol % of IPA, having an IV of 0.81 dl/g and a Tm of 243° C., and containing 100 ppm of a Sb catalyst and 18 equivalents/ton of COOH groups.
B-6: A copolymer of PET not subjected to solid phase polymerization and 12 mol % of IPA, having an IV of 0.65 dl/g and a Tm of 226° C., and containing 100 ppm of a Sb catalyst and 50 equivalents/ton of COOH groups.
B-7: A copolymer of PET subjected to solid phase polymerization and 5 mol % of SEA, having an IV of 0.78 dl/g and a Tm of 239° C., and containing 100 ppm of a Sb catalyst and 25 equivalents/ton of COOH groups.

(2) Measuring Methods
A. Intrinsic Viscosity (IV)

A solution with a concentration of 0.5 g/dl was prepared with the use of a solvent mixture containing phenol and tetrachloroethane in equivalent weights, and the intrinsic viscosity was determined on the basis of the viscosity of the solution measured at a temperature of 20° C.

B. Ester Exchange Index (Ex) and PBT Residue Index (Ea)

A 13C NMR measurement was performed by means of a nuclear magnetic resonance apparatus GEMINI2000/300 (magnetic field strength: 7.05 T) available from Varian Inc. A sample for the measurement was prepared by dissolving a 60- to 100-mg film in 0.7 ml of a $CF_3COOD$ solvent. The ester exchange index (Ex) was determined on the basis of values obtained through integration of peaks (FIG. 1) attributable to the ester exchange from the following expression:

$$Ex=(Sab+Sba)/(Saa+Sbb+Sab+Sba)\times100(\%)$$

Similarly, the PBT residue index (Ea) was determined from the following expression:

$$Ea=Saa/(Saa+Sbb+Sab+Sba)\times100(\%)$$

C. Melting Point (Tm) and Heat-up Crystallization Peak Temperature (Tc)

The melting point (Tm) and the heat-up crystallization peak temperature (Tc) were measured by means of a DSC available from Perkin-Elmer Corp., while a film sample was heated up at 200° C./min. The film sample for the measurement was prepared by melting a stretched film and then rapidly cooling the film at a rate of not lower than 100° C./min to bring the film into an amorphous phase.

D. Heat Laminatability

A 0.21-mm thick tin-free steel sheet and a film sample stacked thereon were supplied at a rate of 20 m/min between a metal roll heated at a predetermined temperature and a silicone rubber roll so as to be heat-bonded to each other with a linear pressure of $4.9\times10^4$ N/m and, after a lapse of two seconds, immersed in ice water for cooling. Thus, a laminate was obtained as a laminated metal sheet.

Then, eleven 18-mm wide test strips (each having an unlaminated portion at an end thereof and a laminated portion having an MD length of not smaller than 8 cm) were cut out of the laminate in the TD direction.

Then, an adhesive tape as specified by JIS Z-1522 was applied onto a film surface of each of the test strips, and a 180-degree peel test was performed at a rate of 10 mm/min by means of an autograph available from Shimadzu Corp. for measurement of a peel strength. The adhesion of the test strip was evaluated on the following criteria:

⊚ (excellent laminatability): Ten or more of the test strips had a peel strength of not smaller than 2.9 N, or film rupture occurred therein with a force of not smaller than 2.9 N.

○ (good laminatability): Five to nine of the test strips had a peel strength of not smaller than 2.9 N, or film rupture occurred therein with a force of not smaller than 2.9 N.

E. Formability

The laminated metal sheet prepared in the test D was subjected to a deep-drawing and ironing process for production of a two-piece can having a volume of 500 ml with an interior surface of a can body thereof being defined by the film of the laminated metal sheet. Then, the can thus produced was filled with 1-wt % salt water, and an electric current was measured with a voltage of 6 V being applied to the can body as an anode, whereby an evaluation was made on defects in the polyester film. In general, the defects increase as the electric current increases. The electric current is preferably not greater than 1 mA to ensure the quality of the can. Where the electric current was not smaller than 5 mA, the laminated metal sheet was regarded to have an unacceptable formability (indicated by x).

F. Retort Resistance

The laminated metal sheet prepared in the test D was subjected to a retort process at 120° C. for 30 minutes, and then the state of the film was inspected. In the evaluation, a laminated metal sheet which apparently suffered from whitening or white spots was regarded to have an unacceptable retort resistance (indicated by x), and a laminated metal sheet which suffered from whitening not apparently but visually perceivably was regarded to have a poor retort resistance (indicated by Δ). Further, a laminated metal sheet which experienced no change as visually observed was regarded to have an excellent retort resistance (indicated by ◯).

G. Shock Resistance

Test samples were prepared from the laminated metal sheets prepared in the test D. A set (i) of ten test samples were subjected to a retort process at 125° C. for 30 minutes. A set (ii) of ten test samples were subjected to a retort process at 125° C. for 30 minutes and then stored in a 50° C. atmosphere for one month. Then, a 1-kg weight (having a spherical front end having a diameter of ½ inch) was dropped onto the film surface of each of these test samples from a height of 50 cm in a 5° C. atmosphere, and the state of the film was observed. The shock resistance was evaluated on the following criteria:

x (Unacceptable): One or more of the test samples suffered from the separation or rupture of the film as visually observed.

Δ (Poor): None of the test samples experienced the separation and rupture of the film as visually observed, but three or more of the test samples suffered from the corrosion of the metal when being immersed in an aqueous solution of copper sulfate.

◯ (Good): None of the test samples experienced the separation and rupture of the film as visually observed, but two or less of the test samples suffered from the corrosion when being immersed in an aqueous solution of copper sulfate.

⊙ (Excellent): None of the test samples experienced the separation and rupture of the film as visually observed, and none of the test samples suffered from the corrosion when being immersed in an aqueous solution of copper sulfate.

H. Taste and Flavor Preserving Property

The 500-ml 2P-can body obtained in the test E was filled with 500-g distilled water, and a commercially available 202 diameter aluminum EO lid was crimped on the can body to seal the can body. The resulting can was subjected to a retort process at 125° C. for 30 minutes. Then, the can was sufficiently cooled to a room temperature, and a tasting test on the content of the can was carried out by 50 panelists to judge if there is a taste difference between the content of the can and the distilled water. On the basis of the results of the tasting test, the taste and flavor preserving property was evaluated on the following criteria. However, the film regarded to have an unacceptable formability (indicated by x) in the formability evaluation in the test E was not subjected to the tasting test, but judged to have an unacceptable taste and flavor preserving property.

◯ (Good): Five or less of the panelists recognized the difference.

Δ (Poor): Not less than five and less than ten of the panelists recognized the difference.

x (Unacceptable): Ten or more of the panelists recognized the difference.

I. Heat-up Crystallization Index (Cp)

By means of a DSC available from Perkin-Elmer Corp., the heat-up crystallization index was measured in conformity with JIS K7123-1987. Sapphire was used as a reference substance. A sample for the measurement was prepared by melting a stretched film and then rapidly cooling the film at a rate of not lower than 100° C./min to bring the film into an amorphous phase. Where the heat-up crystallization peak temperature (Tc) did not fall within a temperature range of 60 to 100° C., a minimum value observed in the range of 60 to 100° C. was employed as the heat-up crystallization index (Cp).

J. Elongation (%) in Tension

With the use of film samples (n=5) each having a width of 10 mm and a length of 10 cm, the elongation in tension was measured at the heat-up crystallization peak temperature (Tc) in conformity with ASTM D882. Data is expressed by minimum values of MD elongation and TD elongation.

(3) EXAMPLES AND COMPARATIVE EXAMPLES

Examples 1 to 6 and Comparative Examples 1 to 10

Unstretched films were each produced by blending a polyester (I) and a polyester (II) each having a composition as shown in Table 1, adding 0.1 wt % of silica having an average particle diameter of 1.1 μm to the blend, melt-mixing the blend by means of an extruder, extruding the resulting melt through an outlet of a T-die, and rapidly solidifying the extruded melt.

Subsequently, the unstretched films were each transported through a preheating zone at 60° C. with edges thereof being held by clips of a tenter-type simultaneous biaxial stretching machine, and then simultaneously biaxially stretched at an MD draw ratio of 3.0 and at a TD draw ratio of 3.3. Thereafter, the resulting films were each subjected to a heat treatment at 150° C. at a TD relaxing ratio of 5% for 4 seconds, then cooled to a room temperature, and wound up. Thus, 25-μm thick biaxially stretched films were obtained.

With the use of each of the films thus obtained, a laminated metal sheet was produced by the method described in the test D, and then evaluated. Further, the formability of the film of the laminated metal sheet produced by the method described in the test D was evaluated in the manner described in the test E. Furthermore, the retort resistance, the shock resistance and the taste and flavor preserving property of the laminated metal sheet were evaluated in the manner described in the tests F, G and H, respectively. The physical properties of the films and the results of the evaluations are shown in Table 2.

TABLE 1

|  | Example | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| Polyester I | | | | | | | | | | | | |
| Composition | A-4 | A-2 | A-1 | A-3 | A-8 | A-5 | A-4 | A-2 | A-8 | A-3 | A-3 | A-10 |
| Intrinsic viscosity | 0.94 | 1.22 | 1.4 | 1.08 | 0.92 | 0.9 | 0.94 | 1.22 | 0.92 | 1.08 | 1.08 | 1.05 |
| COOH-group (eq/ton) | 12 | 7 | 5 | 7 | 18 | 35 | 12 | 7 | 18 | 7 | 7 | 23 |
| Tm (° C.) | 223 | 223 | 223 | 223 | 217 | 223 | 223 | 223 | 217 | 223 | 223 | 216 |
| Polyester II | | | | | | | | | | | | |
| Composition | B-3 | B-2 | B-2 | B-2 | B-3 | B-5 | B-3 | B-2 | B-3 | B-2 | B-2 | B-2 |
| Intrinsic viscosity | 0.64 | 0.75 | 0.75 | 0.75 | 0.64 | 0.81 | 0.64 | 0.75 | 0.64 | 0.75 | 0.75 | 0.75 |
| COOH-group (eq/ton) | 20 | 15 | 15 | 15 | 20 | 18 | 20 | 15 | 20 | 15 | 15 | 15 |
| Tm (° C.) | 255 | 255 | 255 | 255 | 255 | 243 | 255 | 255 | 255 | 255 | 255 | 255 |
| Mixing conditions | | | | | | | | | | | | |
| I/II (wt %) | 50/50 | 55/45 | 60/40 | 75/25 | 60/40 | 50/50 | 50/50 | 55/45 | 60/40 | 50/50 | 60/40 | 75/25 |
| Extrusion temp (° C.) | 270 | 275 | 280 | 275 | 270 | 285 | 270 | 275 | 270 | 275 | 270 | 270 |
| Residence time (min) | 6 | 6 | 6 | 5 | 6 | 8 | 6 | 6 | 6 | 8 | 5 | 8 |
| Stretching method | *1 | *1 | *1 | *1 | *1 | *1 | *2 | *2 | *2 | *1 | *1 | *1 |
| Stretchability | Good | Good | Good | Good | Good | Good | Good | Good | Good | Good | Good | Good |
| Film producing conditions | | | | | | | | | | | | |
| MD temp (° C.) | 80 | 80 | 80 | 80 | 80 | 80 | 55–60 | 55–60 | 55–60 | 80 | 80 | 80 |
| Ratio | 3 | 3 | 3 | 3 | 3 | 3 | 2.8 | 2.8 | 2.8 | 3 | 3 | 2.8 |
| TD temp (° C.) | 80 | 80 | 80 | 80 | 80 | 80 | 80–90 | 80–90 | 80–90 | 80 | 80 | 80 |
| Ratio | 3.3 | 3.3 | 3.3 | 3.3 | 3.3 | 3.3 | 3.6 | 3.6 | 3.6 | 3.3 | 3.3 | 3 |
| Heat setting temp (° C.) | 150 | 150 | 150 | 150 | 150 | 150 | 150 | 150 | 150 | 150 | 150 | 150 |
| Thickness (μm) | 25 | 25 | 25 | 25 | 25 | 25 | 25 | 25 | 25 | 25 | 25 | 20 |

|  | Example | Comparative Example | | | | | | | | | | |
|---|---|---|---|---|---|---|---|---|---|---|---|---|
|  | 13 | 1 | 2 | 3 | 4 | 5 | 6 | 7 | 8 | 9 | 10 | 11 |
| Polyester I | | | | | | | | | | | | |
| Composition | A-3 | A-2 | A-4 | A-6 | A-4 | — | A-3 | A-5 | A-8 | A-9 | A-7 | A-4 |
| Intrinsic viscosity | 1.08 | 1.22 | 0.94 | 0.8 | 0.94 |  | 1.08 | 0.9 | 0.92 | 0.95 | 0.65 | 0.94 |
| COOH-group (eq/ton) | 7 | 7 | 12 | 15 | 12 |  | 7 | 35 | 18 | 30 | 50 | 12 |
| Tm (° C.) | 223 | 223 | 223 | 223 | 223 |  | 223 | 223 | 217 | 204 | 223 | 223 |
| Polyester II | | | | | | | | | | | | |
| Composition | B-7 | B-2 | B-3 | B-3 | B-3 | B-5 | B-5 | B-6 | B-4 | B-2 | B-1 | B-3 |
| Intrinsic viscosity | 0.78 | 0.75 | 0.64 | 0.64 | 0.64 | 0.81 | 0.81 | 0.65 | 0.62 | 0.75 | 0.9 | 0.64 |
| COOH-group (eq/ton) | 25 | 15 | 20 | 20 | 20 | 18 | 18 | 50 | 50 | 15 | 10 | 20 |
| Tm (° C.) | 239 | 255 | 255 | 255 | 255 | 243 | 243 | 226 | 255 | 255 | 255 | 255 |
| Mixing conditions | | | | | | | | | | | | |
| I/II (wt %) | 60/40 | 35/65 | 85/15 | 50/50 | 50/50 | 0/100 | 30/70 | 60/40 | 60/40 | 50/50 | 55/45 | 85/15 |
| Extrusion temp (° C.) | 260 | 280 | 280 | 275 | 280 | 270 | 270 | 275 | 275 | 275 | 280 | 280 |
| Residence time (min) | 10 | 8 | 6 | 6 | 10 | 6 | 6 | 6 | 8 | 6 | 8 | 6 |
| Stretching method | *1 | *1 | *1 | *1 | *1 | *1 | *1 | *1 | *1 | *1 | *1 | *2 |
| Stretchability | Good | Good | Good | Good | Good | Good | Good | Good | Good | Good | Good | Bad |
| Film producing conditions | | | | | | | | | | | | |
| MD temp (° C.) | 80 | 80 | 80 | 80 | 80 | 80 | 80 | 80 | 80 | 80 | 80 | 55–60 |
| Ratio | 3 | 3 | 3 | 3 | 3 | 3 | 3 | 3 | 3 | 3 | 3 | 2.8 |
| TD temp (° C.) | 80 | 80 | 80 | 80 | 80 | 80 | 80 | 80 | 80 | 80 | 80 | 80–90 |
| Ratio | 3.3 | 3.3 | 3.3 | 3.3 | 3.3 | 3.3 | 3.3 | 3.3 | 3.3 | 3.3 | 3.3 | 3.6 |
| Heat setting temp (° C.) | 150 | 150 | 150 | 150 | 150 | 150 | 150 | 150 | 150 | 150 | 150 | 150 |
| Thickness (μm) | 25 | 25 | 25 | 25 | 25 | 25 | 25 | 25 | 25 | 25 | 25 | 25 |

|  | Comparative Example | | | | | |
|---|---|---|---|---|---|---|
|  | 12 | 13 | 14 | 15 | 16 | 17 |
| Polyester I | | | | | | |
| Composition | A-3 | A-8 | A-3 | A-4 | A-3 | A-4 |
| Intrinsic viscosity | 1.08 | 0.92 | 1.08 | 0.94 | 1.08 | 0.94 |
| COOH-group (eq/ton) | 7 | 18 | 7 | 12 | 7 | 12 |
| Tm (° C.) | 223 | 217 | 223 | 223 | 223 | 223 |

TABLE 1-continued

|  | | | | | | |
|---|---|---|---|---|---|---|
| Polyester II | | | | | | |
| Composition | B-5 | B-4 | B-2 | B-3 | B-2 | B-3 |
| Intrinsic viscosity | 0.81 | 0.62 | 0.75 | 0.64 | 0.75 | 0.64 |
| COOH-group (eq/ton) | 18 | 50 | 15 | 20 | 15 | 20 |
| Tm (° C.) | 243 | 255 | 255 | 255 | 255 | 255 |
| Mixing conditions | | | | | | |
| I/II (wt %) | 30/70 | 60/40 | 65/35 | 60/40 | 20/80 | 60/40 |
| Extrusion temp (° C.) | 270 | 275 | 285 | 280 | 280 | 280 |
| Residence time (min) | 6 | 8 | 15 | 10 | 8 | 12 |
| Stretching method | *2 | *2 | *1 | *1 | *1 | *1 |
| Stretchability | Good | Good | Good | Good | Good | Good |
| Film producing conditions | | | | | | |
| MD temp (° C.) | 55–60 | 55–60 | 80 | 80 | 90 | 80 |
| Ratio | 2.8 | 2.8 | 3 | 3 | 3 | 3 |
| TD temp (° C.) | 80–90 | 80–90 | 80 | 80 | 90 | 80 |
| Ratio | 3.6 | 3.6 | 3.3 | 3.3 | 3.3 | 3.3 |
| Heat setting temp (° C.) | 150 | 150 | 150 | 150 | 150 | 150 |
| Thickness (μm) | 25 | 25 | 25 | 25 | 20 | 25 |

*1: Simultaneous biaxial stretching, *2: Successive biaxial stretching

TABLE 2

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Stretched film | | | | | | | | | | | | |
| Melting point I/II (° C.) | 221/252 | 221/251 | 222/251 | 222/247 | 214/251 | 218/239 | 221/253 | 220/252 | 214/251 | 221/253 | 221/250 | 214/246 |
| Intrinsic viscosity | 0.76 | 0.92 | 0.99 | 0.94 | 0.77 | 0.81 | 0.76 | 0.92 | 0.77 | 0.86 | 0.91 | 0.94 |
| Ester exchange index (%) | 3 | 4 | 5 | 4 | 3 | 6 | 3 | 4 | 3 | 6 | 3 | 5 |
| COOH-group (eq/ton) | 18 | 12 | 10 | 13 | 21 | 28 | 18 | 12 | 21 | 17 | 15 | 26 |
| PBT residue index (%) | 48 | 52 | 57 | 72 | 54 | 56 | 48 | 52 | 54 | 46 | 58 | 67 |
| Tc (° C.) | 72 | 70 | 70 | 67 | 68 | 69 | 72 | 70 | 68 | 71 | 68 | 65 |
| Cp (J/g ° C.) | 0.6 | 0.5 | 0.2 | 0.1 | 0.2 | 0.3 | 0.6 | 0.5 | 0.2 | 0.2 | 0.6 | 0.1 |
| Elongation (%) in tension | 130 | 140 | 150 | 120 | 120 | 130 | 130 | 150 | 130 | 140 | 130 | 120 |
| Laminated metal sheet | | | | | | | | | | | | |
| Roll temp (° C.) | 200 | 200 | 200 | 200 | 200 | 200 | 200 | 200 | 200 | 200 | 200 | 200 |
| Heat-laminatability | ⊙ | ⊙ | ○ | ⊙ | ⊙ | ⊙ | ⊙ | ⊙ | ⊙ | ⊙ | ⊙ | ⊙ |
| Formability (mA) | 0.8 | 0.4 | 0.5 | 0.8 | 1 | 0.7 | 0.7 | 0.5 | 1 | 0.5 | 0.3 | 0.8 |
| Shock resistance (i) | ⊙ | ⊙ | ⊙ | ⊙ | ○ | ⊙ | ⊙ | ⊙ | ○ | ⊙ | ⊙ | ⊙ |
| Shock resistance (ii) | ○ | ⊙ | ⊙ | ○ | ○ | ○ | ○ | ⊙ | ○ | ⊙ | ⊙ | ○ |
| Retort resistance | ○ | ○ | ○ | ○ | ○ | ○ | ○ | ○ | ○ | ○ | ○ | ○ |
| Laminated can | | | | | | | | | | | | |
| Taste and flavor preservation | ○ | ○ | ○ | ○ | ○ | ○ | ○ | ○ | ○ | ○ | ○ | ○ |

| | Example | Comparative Example | | | | | | | | | | |
|---|---|---|---|---|---|---|---|---|---|---|---|---|
| | 13 | 1 | 2 | 3 | 4 | 5 | 6 | 7 | 8 | 9 | 10 | 11 |
| Stretched film | | | | | | | | | | | | |
| Melting point I/II (° C.) | 222/234 | 215/247 | 222/245 | 221/252 | 211/237 | 242 | 218/241 | 223 | 213/250 | 198/252 | 211/238 | 221/246 |
| Intrinsic viscosity | 0.93 | 0.86 | 0.86 | 0.67 | 0.71 | 0.78 | 0.85 | 0.75 | 0.72 | 0.8 | 0.68 | 0.86 |
| Ester exchange index (%) | 4 | 7 | 5 | 4 | 10 | — | 5 | 4 | 6 | 4 | 9 | 5 |
| COOH-group (eq/ton) | 19 | 23 | 20 | 19 | 30 | 22 | 18 | 45 | 34 | 28 | 45 | 20 |

TABLE 2-continued

|  | | | | | | | | | | | | |
|---|---|---|---|---|---|---|---|---|---|---|---|---|
| PBT residue index (%) | 58 | 31 | 82 | 47 | 54 | 0 | 27 | 58 | 52 | 41 | 50 | 82 |
| Tc (° C.) | 61 | 72 | 62 | 70 | 75 | 185 | 76 | 67 | 69 | 65 | 69 | 62 |
| Cp (J/g ° C.) | 0.3 | 0.1 | −0.3 | 0.2 | −0.1 | 1.3 | 0.5 | 0.3 | 0.1 | 0.3 | 0.2 | −0.3 |
| Elongation (%) in tension | 130 | 130 | 70 | 110 | 130 | 140 | 130 | 130 | 120 | 120 | 90 | 60 |
| Laminated metal sheet | | | | | | | | | | | | |
| Roll temp (° C.) | 200 | 200 | 200 | 200 | 200 | 200 | 200 | 200 | 200 | 200 | 200 | 200 |
| Heat-laminatability | ⊚ | ○ | ⊚ | ⊚ | ⊚ | ○ | ⊚ | ⊚ | ⊚ | ⊚ | ⊚ | ⊚ |
| Formability (mA) | 0.5 | 0.8 | X | X | X | 1.2 | 0.8 | 0.9 | 2.4 | X | X | X |
| Shock resistance (i) | ⊚ | Δ | X | X | Δ | X | ○ | X | ○ | X | X | X |
| Shock resistance (ii) | ○ | X | X | X | X | X | X | X | X | X | X | X |
| Retort resistance Laminated can | ○ | ○ | ○ | ○ | Δ | Δ | Δ | X | ○ | Δ | ○ | ○ |
| Taste and flavor preservation | ○ | ○ | Unacceptable | Unacceptable | Unacceptable | X | Δ | X | X | Unacceptable | Unacceptable | Unacceptable |

|  | Comparative Example | | | | | |
|---|---|---|---|---|---|---|
|  | 12 | 13 | 14 | 15 | 16 | 17 |
| Stretched film | | | | | | |
| Melting point I/II (° C.) | 218/242 | 213/252 | 205 | 212/239 | 217/254 | 212/239 |
| Intrinsic viscosity | 0.85 | 0.72 | 0.82 | 0.72 | 0.76 | 0.7 |
| Ester exchange index (%) | 5 | 6 | 15 | 9 | 5 | 11 |
| COOH-group (eq/ton) | 18 | 34 | 35 | 29 | 18 | 31 |
| PBT residue index (%) | 27 | 52 | 56 | 55 | 18 | 54 |
| Tc (° C.) | 76 | 69 | 75 | 67 | 120 | 72 |
| Cp (J/g ° C.) | 0.5 | 0.1 | −2 | 0.1 | 1.2 | −0.5 |
| Elongation (%) in tension | 130 | 130 | 100 | 120 | 140 | 110 |
| Laminated metal sheet | | | | | | |
| Roll temp (° C.) | 200 | 200 | 170 | 200 | 230 | 200 |
| Heat-laminatability | ⊚ | ⊚ | ⊚ | ⊚ | ⊚ | ⊚ |
| Formability (mA) | 1.5 | 4.3 | X | X | 4.1 | X |
| Shock resistance (i) | Δ | Δ | X | Δ | X | Δ |
| Shock resistance (ii) | X | X | X | Δ | X | Δ |
| Retort resistance Laminated can | Δ | ○ | ○ | ○ | Δ | ○ |
| Taste and flavor preservation | Δ | X | Unacceptable | Unacceptable | X | Unacceptable |

Examples 7 to 9 and Comparative Examples 11 to 13

Unstretched films as shown in Table 1 were each introduced into a roll-type vertical (MD) stretching machine, then preheated from 45° C. up to 55° C., and vertically stretched at a draw ratio of 2.8 at 55 to 60° C. After being cooled, the resulting films were each continuously introduced into a tenter-type transverse stretching machine, then preheated at 75° C. with opposite edges thereof being held by clips, and transversely stretched at a draw ratio of 3.6 while being gradually heated from 80° C. to 90° C. Thereafter, the resulting films were each subjected to a heat treatment at 150° C. for four seconds and then to a 4% relaxation process, then cooled, and wound up. Thus, successively biaxially stretched films having a thickness of 25 μm were obtained.

With the use of each of the films thus obtained, a laminated metal sheet was produced and evaluated in the same manner as in Example 1. The physical properties of the films and the results of the evaluations are shown in Table 2.

The films of Examples 1 to 9 were excellent in heat laminatability, formability, shock resistance, retort resistance, and taste and flavor preserving property. In contrast, none of the films of Comparative Examples 1 to 13 are satisfactory in all the physical properties.

Comparative Example 14

As shown in Table 1, 65 parts by weight of the polyester (A-3) and 35 parts by weight of the polyester (B-2) were dry-blended, and melt-extruded into a sheet form at 285° C.

by means of an extruder having a T-die (residence time: 15 minutes). The resulting sheet was cooled in intimate contact with a cooling drum having a surface temperature of 18° C. Thus, a 240-μm thick unstretched sheet was obtained.

The unstretched sheet thus obtained was transported through a preheating zone at 60° C. with edges thereof being held by clips of a tenter-type simultaneous biaxial stretching machine, and then simultaneously biaxially stretched at an MD draw ratio of 3.0 and at a TD draw ratio of 3.3 at a temperature of 80° C. Thereafter, the resulting sheet was subjected to a heat treatment at a TD relaxing ratio of 5% at a temperature of 150° C. for four seconds, then cooled to a room temperature, and wound up. Thus, a biaxially stretched film having a thickness of 25 μm was obtained.

The physical property values of the film thus obtained are shown in Table 2.

Comparative Examples 15 and 16

Films were each produced in substantially the same manner as in Comparative Example 14, except that the types and blend ratios of the material resins and the film producing conditions were changed as shown in Table 1.

The physical properties of the films thus obtained are shown in Table 2.

None of the films obtained in Comparative Examples 14 to 16 were satisfactory in all of the heat laminatability, the formability, the shock resistance, the retort resistance, and the taste and flavor preserving property.

Example 10

First, 50 parts by weight of the polyester (A-3) and 50 parts by weight of the polyester (B-2) were dry-blended, and melt-extruded into a sheet form at 275° C. by means of an extruder having a T-die (residence time: 8 minutes). The sheet was cooled in intimate contact with a cooling drum having a surface temperature of 18° C. Thus, a 240-μm thick unstretched sheet was obtained.

The unstretched sheet thus obtained was transported through a preheating zone at 60° C. with edges thereof being held by clips of a tenter-type simultaneous biaxial stretching machine, and then simultaneously biaxially stretched at an MD draw ratio of 3.0 and at a TD draw ratio of 3.3 at a temperature of 80° C. Thereafter, the resulting sheet was subjected to a heat treatment at a TD relaxing ratio of 5% at a temperature of 150° C. for four seconds, then cooled to a room temperature, and wound up. Thus, a biaxially stretched film having a thickness of 25 μm was obtained.

The film producing conditions and the physical property values of the film thus obtained are shown in Tables 1 and 2.

Examples 11 to 13 and Comparative Example 17

Films were each produced in substantially the same manner as in Example 10, except that the material resins, the blend ratios and the film producing conditions were changed as shown in Table 1.

The film producing conditions and the physical property values of the films are shown in Tables 1 and 2.

The films obtained in Examples 10 to 13 were excellent in heat laminatability, formability, shock resistance and retort resistance. In contrast, the film of Comparative Example 17 was unsatisfactory in properties other than the retort resistance.

What is claimed is:

1. A polyester film for metal sheet laminating, the polyester film comprising a blend of a polyester (I) consisting of polybutylene terephthalate or consisting essentially of polybutylene terephthalate and a polyester (II) consisting of polyethylene terephthalate or consisting essentially of polyethylene terephthalate, the polyester (I) being present in the film in a proportion of 80 to 40 wt %, the polyester (II) being present in the film in a proportion of 20 to 60 wt %, the polyester (I) having a melting point of 200 to 223° C., the polyester (II) having a melting point of 230 to 256° C., the film entirely having an intrinsic viscosity of not lower than 0.75, the film having a heat-up crystallization peak temperature of 60 to 100° C. at which a transition from an amorphous phase occurs, and a heat-up crystallization index of not smaller than 0 J/g•° C. in a temperature range of 60 to 100° C.

2. A polyester film for metal sheet laminating, as set forth in claim 1, wherein an index of ester exchange between the polyester (I) and the polyester (II) is 1 to 10%.

3. A polyester film for metal sheet laminating, as set forth in claim 2, wherein the index of the ester exchange between the polyester (I) and the polyester (II) is 2 to 7%.

4. A polyester film for metal sheet laminating, as set forth in claim 1, wherein terminal carboxyl groups are present in a proportion of not greater than 30 equivalents/ton.

5. A polyester film for metal sheet laminating, as set forth in claim 1, which has a polybutylene terephthalate residue index of 40 to 75%.

6. A polyester film for metal sheet laminating, as set forth in claim 1, which has an elongation of not smaller than 100% at rupture at the heat-up crystallization peak temperature.

7. A film-laminated metal sheet, wherein a polyester film as recited in any one of claims 1 to 5 or 6 is laminated on a metal sheet directly or with the intervention of an adhesive.

8. A metal container produced by working a film-laminated metal sheet as recited in claim 7.

\* \* \* \* \*